2,748,133

NORTROPANOL ESTERS

Paul Karrer, Zurich, and Jindrich Kebrle, Basel, Switzerland, assignors to Sandoz A. G., Basel, Switzerland, a Swiss firm No Drawing. Application February 28, 1955,
Serial No. 491,205

Claims priority, application Switzerland March 3, 1954

6 Claims. (Cl. 260—292)

The present invention reates to nortropane derivatives. More particularly, the invention is concerned with nortropanol carboxylic acid esters which correspond to the formula

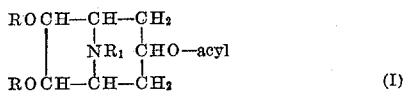

wherein each of R and $R_1$ represents the same or a different alkyl group and also to the salts and quaternary ammonium compounds of said esters.

Carboxylic acids from which the new esters are derived include, for example, lower fatty acids, such as acetic acid, propionic acid, butyric acid, valeric acid, isovaleric acid, tiglic acid, etc.; aromatic carboxylic acids, such as benzoic acids, for example benzoic acid, alkoxy benzoic aids, methylene dioxy benzoic acids, etc.; and araliphatic acids, such for example as tropic acid, phenyl lactic acid, mandelic acid, fluorenyl-9-carboxylic acid, 9-hydroxy-fluorenyl-9-carboxylic acid, benzilic acid, diphenyl acetic acid, phenyl-cyclohexyl acetic acid, phenyl-1-hydroxy-cyclohexyl acetic acid, xanthene-9-carboxylic acid, etc.

Especially suitable quaternary ammonium compounds are such as contain on the nitrogen atom as additional substituent a lower alkyl group, for example halogen methylates.

These nortropanol esters of Formula I can advantageously be severally prepared by hydrolyzing the appropriate 2,3,4,5-tetraalkoxy-tetrahydrofurane, then condensing the resultant α,α'-dialkoxy-succinic-dialdehyde with a corresponding primary amine and with acetone-dicarboxylic acid, reducing the so-obtained 6,7-dialkoxy-N-alkyl-nortropinone to the corresponding tropine or pseudo-tropine derivative, depending upon whether catalytically activated or nascent hydrogen is employed for the reduction, and esterifying the obtained derivative with an aliphatic, aromatic or aromatic-aliphatic acid. Upon treatment with acids, the resultant esters yield the corresponding salts, and with halogen-alkyls or other alkyl esters of inorganic acids they yield quaternary compounds. The foregoing may be schematically represented as follows:

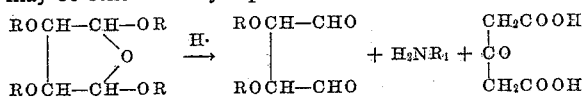

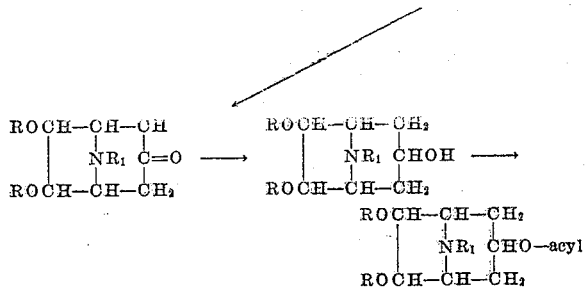

wherein R and $R_1$ have the aforesaid significances.

The 2,3,4,5-tetraalkoxy-tetrahydrofurane, employed as starting material, can be prepared in various ways; for example, 2,5-dialkoxy-3,4-dihydroxy-tetrahydrofurane may be etherified.

In preparing the nortropanol esters of Formula I, the appropriate 2,3,4,5-tetraalkoxy-tetrahydrofurane is hydrolyzed with dilute mineral acid, and the obtained α,α'-dialkoxy-succinic-dialdehyde is reacted with the primary amine and with acetone-dicarboxylic aid in dilute buffered aqueous solution at room temperature (20-30° C.). Reduction of the resultant 6,7-dialkoxy-N-alkylnortropinone yields the corresponding tropine derivative if catalytically activated hydrogen is employed or the corresponding pseudo-tropine derivative if nascent hydrogen is employed. The tropine or pseudo-tropine derivative may then be esterified, for example by the action thereon of an acid ester under the catalytic influence of an alkali metal. The esterification may also be carried out with an acid chloride.

The compounds used as starting materials can also be used in the form of their salts or quaternary ammonium compounds.

The new compounds are obtained in the form of the ester bases, or salts or quaternary compounds thereof. From the salts, the free tertiary amines or amonium compounds can be obtained in per se known manner. From the bases, conversely, by reaction with acids which more especially are suitable for the formation of therapeutically useful salts, salts can be obtained, as for example those of the hydrohalic acids, nitric acid, phosphoric acid, thiocyanic acid, malic acid, methane sulphonic acid, hydroxyethane sulphonic acid, benzene or toluene sulphonic acids or other therapeutically active acids. Tertiary amine products can be quaternated in per se customary manner.

The nortropanol esters I of the present invention, as well as their tertiary and quaternary salts, are solid crystalline compounds and are pharmacodynamically very active. They are distinguished for example by their excellent action on the parasympathicus, and they are also useful in therapy as spasmolytica. They have further utility as intermediates in the preparation of other therapeutica.

Presently-preferred representative embodiments of the invention are set forth in the following illustrative examples. In such examples, the relationship between parts by weight and parts by volume is the same as that between grams and milliliters. The temperatures are in degrees centigrade.

Example 1

5 parts by weight of 6,7-dimethoxy-tropine hydrochloride are dissolved in 40 parts by volume of pyridine, and then 15 parts by weight of phenyl-cyclohexyl-acetic acid chloride are added. The reaction mixture is allowed to stand for 12 hours, after which it is boiled under reflux for 40 minutes. The resultant solution, which turns brownish in color, is evaporated under reduced pressure as far as possible, 100 parts by volume of water are added, the mixture acidified with hydrochloric acid and then freed of excess phenyl-cyclohexyl-acetic acid by shaking out with ether. The aqueous layer is then made alkaline with aqueous caustic soda solution, and again exhaustively extracted with ether. The ether extract is dried over magnesium sulfate, mixed with a small quantity of animal charcoal, filtered and evaporated. There remain, as residue, 6.5 parts by weight of crude ester base. The later can be purified by distillation under a high vacuum (boiling point=160–170°/0.03 mm., air-bath), or by crystallization from a small quantity of ether. The so-obtained phenyl-cyclohexyl-acetic acid ester of 6,7-dimethoxy-tropine of the formula

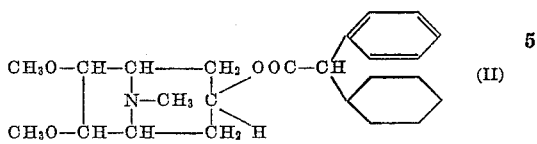

melts at 112°.

By neutralizing the base II with alcoholic hydrochloric acid, evaporating the resultant solution almost to dryness, and adding a small quantity of ether to the residue, there crystallizes out the hydrochloride of such base. Melting point of the hydrochloride=180–184° (with decomposition).

Upon adding 10 parts by volume of methyl iodide to the free base, the corresponding iodomethylate soon crystallizes out of the solution. After 12 hours, the iodomethylate is filtered off and recrystallized from alcohol or water. It melts at 244–246° (with decomposition).

By shaking a solution of the iodomethylate in warm water with a five-fold excess of freshly precipitated silver chloride, the iodomethylate is converted into the corresponding chloromethylate. The latter is advantageously recrystallized from alcohol-ether. It contains water of crystalliaztion, melts at 90–93°, re-solidifies and again melts at 217° with forming.

The 6,7-dimethoxy-tropine hydrochloride, used as starting material can be prepared as follows:

10 parts by weight of 2,5-dimethoxy-3,4-dihydroxy-tetrahydrofurane are boiled under reflux for 6 hours, with stirring, in 300 parts by volume of methyl iodide containing 80 parts by weight of silver oxide, after which the excess methyl iodide is evaporated off under reduced pressure at room temperature. The residue is extracted several times with dry ether, and after removal of the ether the combined extracts are distilled under reduced pressure. The so-obtained 2,3,4,5-tetramethoxy-tetrahydrofurane boils at 95° under a 12 mm. Hg-pressure. 11.5 parts by weight of this product are dissolved in 200 parts by volume of 0.1-normal hydrochloric acid and the solution kept at 75° for 30 minutes. The cooled solution, containing the formed 2,3-dimethoxy-butane-1,4-dialdehyde is added to a solution of 14.6 parts by weight of acetone-dicarboxylic acid, 6.75 parts by weight of methylamine hydrochloride, 34 parts by weight of sodium acetate and 900 parts by volume of water. The pH of the solution is 4.7. The mixture is allowed to stand for 3 days at 25°, the pH of the solution rising to 5.3 with cessation of the $CO_2$-evolution. The color of the solution is now weakly brown. The reaction mixture is then made strongly alkaline with solid potassium carbonate, saturated with sodium chloride, and continuously extracted with ether for 3 days. The ether extract leaves behind, upon evaporation of the solvent, a brownish oil which distils at 105–110° (air-bath temperature) under a pressure of 0.05 mm. The hydrochloride of the so-obtained 6,7-dimethoxy-tropinone of the formula

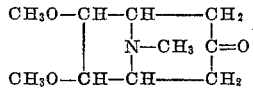

crystallizes from alcohol-ether. It decomposes at 198° after first turning brown. The base forms a picrate which can be recrystallized from alcohol or acetone-water and which decomposes at 198–204° after first turning brown. 5 parts of the thus-prepared 6,7-dimethoxy-tropinone hydrochloride are hydrogenated at room temperature and at normal pressure in 80 parts by volume of methanol containing 0.250 part by weight of platinum catalyst. The compound rapidly absorbs the calculated quantity of hydrogen. After filtering off the catalyst and evaporating the solvent, there remains behind the crystalline hydrochloride of the 6,7-dimethoxy-tropine of the formula

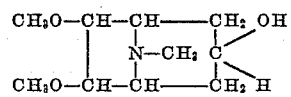

which, after a single recrystallization from ethanol-ether, melts at 207°, with decomposition.

Example 2

A mixture of 7 parts by weight of 6,7-dimethoxy-tropine and 4.17 parts by weight of benzilic acid methylester is heated until a homogeneous melt is obtained and, after the addition of 0.18 part by weight of extremely finely cut sodium, is heated to 100° under a pressure of 12 mm. Hg. After about 1 hour (when foaming has somewhat subsided), the temperature is raised to 115° and the vacuum to 1 mm. of Hg. At the end of 8 hours, the reaction is practically ended. 100 parts by volume of 2-normal hydrochloric acid and 100 parts by volume of ether are added, and the mixture shaken. The acid aqueous layer is separated, shaken out three times with ether and, in the presence of 100 parts by volume of chloroform and while shaking, rendered alkaline with KOH. The alkaline aqueous solution is then shaken out three more times, each time with 50 parts by volume of chloroform. The combined chloroform extracts are dried over $MgSO_4$ and freed of solvent. The residue is dissolved in a minimum quantity of warm ether and allowed to stand. After several hours, the formed benzilic acid ester crystallizes out as colorless small prisms which melt at 135°.

The hydrochloride of the base, prepared after the manner described in Example 1, crystallizes out of alcohol-ether; it melts at 253–256° (with decomposition).

The iodomethylate of the base is produced directly in crystalline form by the action of excess methyl iodide on the free base. The chloromethylate is prepared by the action of freshly precipitated AgCl on an aqueous solution of the iodomethylate. The chloro-methylate crystallizes well from ethanol-ether.

The acylating agents used in the foregoing examples can be replaced by acylating agents derived from any of the other carboxylic acids, hereinbefore enumerated.

The quaternating agents employed in the examples may be replaced by any other conventional quaternating agent, alkyl halide or other alkyl ester of an inorganic acid, etc.

The ester bases of the examples or the quaternary ammonium compounds can be converted to the salts of any of the hereinbefore enumerated salt-forming acids.

Having thus disclosed the invention, what is claimed is:

1. A compound selected from the group consisting of nortropanol esters which correspond to the formula

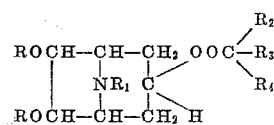

therapeutically-useful salts thereof with acids, and the quaternary ammonium compounds thereof, wherein each of R and $R_1$ is lower alkyl, $R_2$ is a member selected from the group consisting of hydrogen and hydroxyl, and each of $R_3$ and $R_4$ is a member selected from the group consisting of phenyl and cyclohexyl.

2. The phenyl-cyclohexyl-acetic acid ester of 6,7-dimethoxy-tropine, corresponding to the formula

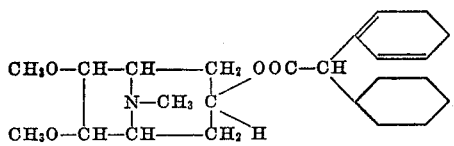

3. The iodomethylate of the phenyl-cyclohexyl-acetic acid ester of dimethoxy-tropine.

4. The chloromethylate of the phenyl-cyclohexyl-acetic acid ester of dimethoxy-tropine.

5. The hydrochloride of the phenyl-cyclohexyl-acetic acid ester of dimethoxy-tropine.

6. The 6,7-dimethoxy-tropine-benzilic acid ester.

No reference cited